INVENTOR.
F. C. GIBBS

United States Patent Office 3,429,866
Patented Feb. 25, 1969

3,429,866
POLYMERIZATION
Frank C. Gibbs, Bartlesville, Okla., assignor to Phillips Petroleum Company, a corporation of Delaware
Filed Nov. 30, 1964, Ser. No. 414,571
U.S. Cl. 260—94.9
Int. Cl. C08f *1/94;* B07b *1/30*
4 Claims

ABSTRACT OF THE DISCLOSURE

Specification polymer produced in a system wherein polymer particles are dried in a drying zone is recovered using a vibrating screen zone from which nonspecification material is continuously removed.

---

Figure 1:
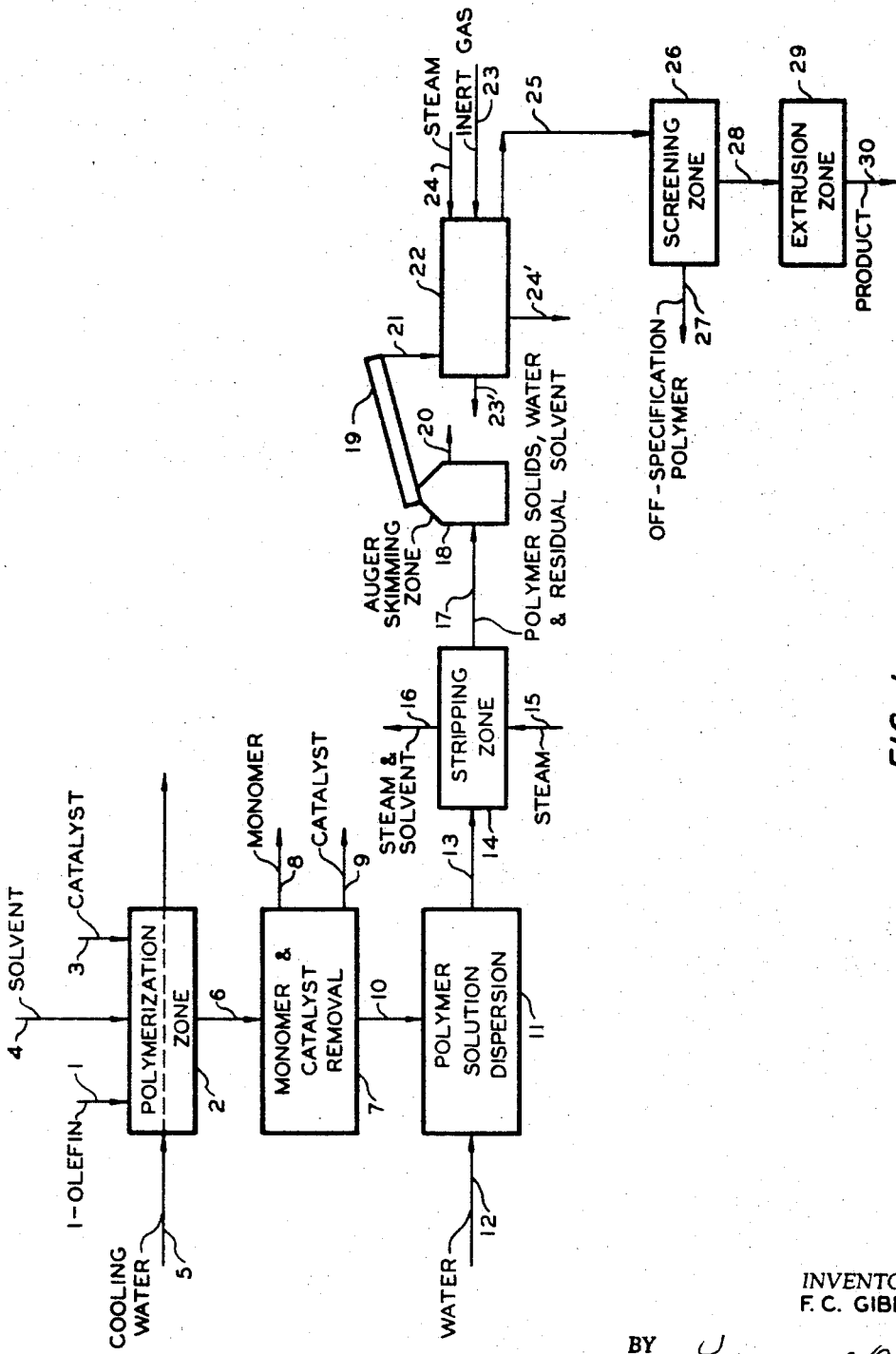

This invention relates to a method and apparatus for treating polymers.

Heretofore, certain solid olefin polymers have been prepared utilizing a carrier liqud to precipitate the polymer from solution. The carrier liquid and any associated solvent was then removed from the precipitated polymer by passing same through a drying zone to produce dry polymer particles suitable for further processing such as extrusion. The polymer product in order to meet specification requirements must be a white material substantially free of any substantial type of off-white discoloration. At various times during the production of such polymers substantial amounts of discolored and therefore off-specification polymer has been formed and removed from the system as final product along with white, specification polymer. The presence of even a minor amount of off-specification polymer can render the total final polymer product off-specification and thereby materially decrease the value of the whole product.

It has now been found that the discolored, off-specification polymer is at least in part produced in the drying zone wherein the polymer is heated to a temperature below but substantially to its softening point in order to effect maximum vaporization of carrier liquid and solvent still associated with the polymer particles. Although it is not completely understood and it is not desired to be bound thereby, it appears that at least some of the polymer softens or melts and coats the heating surfaces of the drying zone. This coating is then, over a period of time, charred, burned or otherwise discolored by the intimate and prolonged contact with the hot heating surface. Although it is also not completely understood and therefore it is not desired to be bound thereby, it appears that the coating of the heating surfaces with polymer is promoted, even when the heating surface is at a temperature below the melting point of the polymer itself, by the presence of some residual solvent in the polymer which will, due to its plasticizing effect on the polymer, decrease the softening point of the polymer particle to or below the temperature of the heating surface.

The coating of off-specificiation polymer on the heating surface, due to various circumstances also not completely understood, sluffs off in cake form at varying rates and commingles with the specification polymer passing through the drying zone. It appears that at least part of the cause of the above sluffing is temperature variations in the drying zone. Temperature variations are possibly at least in part caused by varying rates of flow of specification polymer through the drying zone and by varying types of specification polymer passing through said drying zone.

It was also found, and surprisingly so, that although the manual removal of off-specification polymer cakes solved the problem of consistently producing specification polymer, when a vibrating screen was utilized in lieu of manual separation the cake polymer tended to collect on the vibrating screen prior to removal therefrom and the problem of off-specification polymer showing up in the final polymer product reappeared.

It was then found that if the cake polymer was continuously removed from the screen zone and thereby not allowed to collect on same the problem of off-specification polymer in the final product was again obviated.

Finally, it was found that a screening apparatus comprising a container having upstanding sides to contain the polymer particles and cake polymer, having a substantial portion of the bottom surface in one end of the container open and a screening means in the open portion, and having a discharge aperture opening connected to the end of the container which contains the imperforate bottom portion, i.e., which is opposite to that end which contains the screening means, could be vibrated in a manner such that the polymer particles fall through the screen and the cake polymer continuously moves from the screen without collecting thereon to the imperforate portion of the bottom surface and out the discharge aperture. By the use of this apparatus the above problem of off-specification polymer in the final product is obviated.

Accordingly, it is an object of this invention to provide an improved method of producing a specification polymer. It is another object of this invention to provide improved apparatus for the production of specification polymer.

Other aspects, objects and the several advantages of the invention will be apparent to those skilled in the art from the description and the appended claims.

FIGURE 1 diagrammatically illustrates a system embodying this invention.

Figure 2:
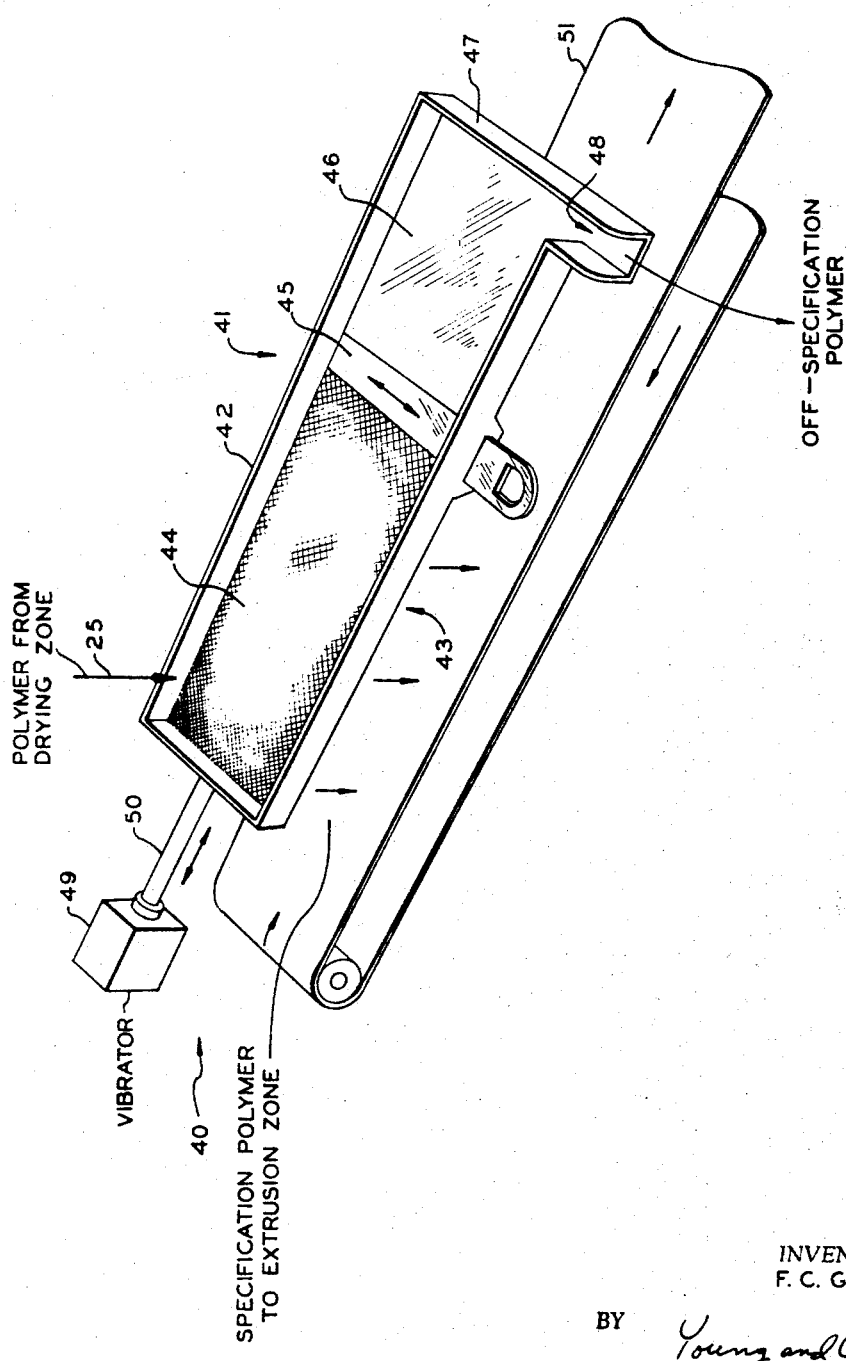

FIGURE 2 shows a perspective view of screening apparatus according to this invention.

In FIGURE 1 of the drawing, a feed stream consisting essentially of polymerizable monoolefins, for example, ethylene, is passed by 1 to polymerization zone 2. A suitable catalyst, for example, chromium oxide containing hexavalent chromium associated with silica-alumina, is passed by 3 into polymerization zone 2. The catalyst is usually dispersed in at least a portion of the solvent required in the operation. Additional solvent, for example cyclohexane, is added by 5 to polymerization zone 2. The igredients in lines 1, 3 and 4 are preferably at polymerization temperature, i.e., from about 230 to about 300° F.; however, one or more streams can be cooler with the remaining streams warmer so that the resulting dispersion is of the proper temperature. Since the polymerization reaction is exothermic it is necessary to remove heat from 2 which is accomplished by indirect heat exchange effected by passing cooling fluid such as water through 2 by 5. The polymerization zone effluent, at about 280° F., passes from 2 by 6 through monomer and catalyst removal zone 7 wherein first the monomer by 8 and then the catalyst by 9 is removed from the solution of polymer in a solvent by known methods such as fractionation, coalescing and the like.

The polymer solution from 7 then passes by 10 to polymer solution dispersion zone 11 wherein the polymer solution is dispersed in a carrier liquid such as water of a temperature sufficiently low so as to cause polymer to precipitate and under conditions such that both the water and solvent remain as liquid phases. For example, the polymer solution entering 11 can be at a temperature of about 240° F. and the water entering 11 by 12 can be at a temperature of about 100° F. The dispersion can be effected by use of a spray nozzle, colloid mill, mixing T, a combination of these means and the like. Sufficient water is admixed with the polymer solution to provide a resulting temperature in the range of from about 100 to 130° F., preferably about 120° F.

The resulting dispersion passes by 13 to stripping zone 14 which is operated at a temperature and pressure which will vaporize the solvent present. Steam is added by 15 as a source of heat to 14 to vaoprize the solvent and a mixture of steam and solvent is removed from 14 by 16. Stripping zone 14 will operate at atmospheric pressure at a temperature from about 150 to 190° F.; however, when under vacuum, the temperature will be lower, for example about 140° F. at 7 p.s.i.a. Since the polymer is lighter than water and will flow, it is preferred to provide stripping zone with an agitation means to maintain the solids in dispersion. The agitator can be rotated at a speed in the range of from about 25 to 200 r.p.m.

A mixture of polymer solids, water and residual solvent primarily associated with the polymer solids passes from 14 by 17 to auger skimming zone 18. In 18 the polymer solids are allowed to float to the top of the carrier liquid in zone 18 and the solids are removed by inclined auger 19. Water freed of polymer solids is removed from 18 by 20. Suitable skimming zone apparatus is disclosed in U.S. Patent 2,929,508, issued to J. M. Folz, Mar. 22, 1960, and in U.S. Patent 2,957,861, issued to R. R. Goins on Oct. 25, 1960. Inclined auger 19 transfers the polymer solids by 21 to drying zone 22 wherein steam or other heating fluid is passed through 24 and coils exposed to the interior of zone 22 to heat the polymer solids substantially to but below the softening point of said solids to remove both water and solvent still associated therewith. Liquid water formed by polymer in zone 22 extracting heat from the steam in 24 is removed from zone 22 by 24'. An inert gas such as helium is passed into and out of zone 22 by 23 and 23'. Zone 22 can be any suitable type which has exposed to the interior thereof heating surfaces such as tubes into which a heating medium such as steam is passed. A suitable drying zone is fully and completely disclosed in copending application Ser. No. 174,002 assigned to the same assignee. The drying zone can be operated at any temperature which will vaporize water and solvent and which is below the softening point of the polymer. Although the temperature can vary widely it will generally be in the range of from about 212 to about 350° F. The effluent from drying zone 22 will generally be at a temperature in the range of from about 100 to about 220° F. The amount of polymer coating on the heating surfaces in drying zone 22 will vary to a large extent but can within a matter of hours or up to a matter of days deposit up to ¼ inch of polymer on such surfaces. This ¼ inch coating will be at a later date sluff off and if not removed will ultimately show up as off-specification polymer in the final polymer product of the process. The effluent from drying zone 22 which contains both white specification polymer particles and discolored, off-specification cake polymer passes by 25 to screening zone 26 wherein off-specification polymer is separated from the specification polymer and removed by 27. Specification polymer passes from screening zone 26 by 28 to extrusion zone 29 wherein the polymer particles are melted, extruded into strands, cooled and chopped into pellets which are removed to product storage for other disposition by 30.

A full and complete disclosure of a polymerization process similar to that described above can be found in U.S. Patent 2,957,861.

In FIGURE 2 polymer effluent from drying zone 22 passes by 25 onto screening apparatus 40 which comprises a container 41 having upstanding sides 42 around all edges thereof and having the top surface open. The bottom surface 43 of container 41 has a substantial portion in the upstream end of said container open and occupied by screen 44. The size of the openings in screen 44 will depend upon the size of the polymer particles in the stripping zone 14 that are formed, the amount of cake polymer that can be tolerated to pass through screen 44 and the like, but will generally range from about 2 mesh to 6 mesh, preferably 4 mesh steel-wire screens. The specification polymer particles will vary widely as to size but generally will have a maximum, major axis length of no more than about ⅛ inch. However, at times the specification polymer will be elongate and not of a particulate configuration. The elongate, e.g., of a length of several inches or more, will not pass through screen 44. In order not to lose this polymer there is provided in bottom portion 43 a removable section 45 which can be removed thereby in effect by-passing screen 44. The remaining part 46 of bottom portion 43 is imperforate so that cake polymer can accumulate when stopped by end dam 47 thereby allowing cake polymer to be continuously removed from screen 44 without collecting thereon prior to removal from 41 by discharge aperture 48. The cake polymer will also vary widely as to size but generally will have a maximum, major axis length of no less than ½ inch. Thus, the cake polymer is of a size which prevents it from passing through screen 44.

Container 41 is vibrated by 49 which is operatively connected to 41 by 50 and adapted to vibrate or otherwise reciprocate 41 in a manner such that polymer from 25 is conveyed across screen 44 and removable section 45 into imperforate end section 46 and out of the system through discharge aperture 48. During the travel of the polymer from 25 across screen 44 specification polymer particles fall through screen 44 and onto conveyor 51 to be transferred to further processing such as to extrusion zone 29 of FIGURE 1.

The solid polymers of the process of this invention can be prepared from any one of a wide variety of olefins, preferably monoolefins, still more preferably mono-1-olefins. Suitable olefins include ethylene, propylene, butene, butene-1, isoprene and the like. Preferred olefins are those having from 2 to 8 carbon atoms per molecule. The polymers produced can be either homopolymers or copolymers of the above olefins.

The temperature required for polymerizing olefins varies over a wide range; however, generally the reaction is carried out at a temperature from about 150 to about 450° F. The particular temperature in each case depends on the catalyst used, the olefin to be polymerized and the operating conditions employed such as pressure, space velocity, solvent-to-olefin ratio and the like. The polymerization pressure is maintained at a level sufficient to assure liquid phase reaction and is generally from 100 to about 5000 p.s.i.g. depending upon the type of feed material and the polymerization temperature. A preferred polymerization method is described in U.S. Patent 2,825,721, issued to Hogan and Banks.

The solvent employed in the polymerization reaction includes paraffins which can at least partially dissolve the polymers at the temperature employed in the polymerization zone. Among the more useful solvents are paraffins having from about 3 to about 12, preferably from about 5 to about 12 carbon atoms per molecule. Representative solvents are propane, isobutane, n-pentane, isopentane, isooctane and the like. Also useful in the polymerization reaction are alicyclic hydrocarbons such as cyclohexane, methylcyclohexane and the like. Aromatic diluents can also be employed; however, in some instances they can tend to shorten catalyst life.

Generally, the specification polymer product will be white and will not have off-white specks or streaks therein and will therefore be suitable for fabrication into consumer products. The off-specification polymer will generally have black or brownish-to-greenish discoloration or both in the form of specks and/or streaks.

Although this invention has been described in detail with reference to carrier liquid coagulated polymer processes, it should be noted that this invention is applicable to any polymerization process wherein polymer particles are formed in a carrier liquid or solvent or both such as conventional slurry polymerization processes.

Example

A solid ethylene polymer was prepared in a reactor in the presence of a chromium oxide catalyst, containing hexavalent chromium, having a composition of about 2.4 weight percent chromium of which about 2.2 weight percent was hexavalent chromium, associated with silica-alumina prepared by impregnating said silica-alumina with chromium trioxide solution followed by drying and activating in dry air for several hours at temperatures up to 950° F.

The solid ethylene polymer after monomer and catalyst removal, dispersing in water, removal of solvent by steam stripping and removal of the polymer particles from the water carrier liquid was passed at a rate of 1300 pounds per hour through a steam tube rotary dryer in which the outer cylinder of the dryer which contains the polymer is revolved about stationary steam-containing tubes heated to a temperature of 300° F. and then to a 4 mesh steel-wire screen 12 inches wide and 6 feet long. The screen was synchronously vibrated. Off-specification cake polyethylene was removed from the discharge aperture of the screen container at the rate of 0 to 200 lbs./day. Polyethylene particles of approximately ⅛ inch average length were removed from below the screen at the rate of 24,000 lbs./day and were found to be sufficiently white to meet specification requirements. The off-specification cake polymer had an average size of from ½ inch to 5 inches.

Reasonable variations and modifications of this invention can be made, or followed, in view of the foregoing, without departing from the spirit or scope thereof.

I claim:

1. A method for producing specification polymer comprising forming a mixture of solid polymer particles and a carrier liquid, separating said particles from said carrier liquid, drying said particles by passing same through a heated drying zone in which the polymer is directly exposed to and in part contacted with heating surfaces of said zone and in which the polymer is heated substantially to but below its softening point, passing the effluent from said drying zone which contains both white specification polymer particles and off-specification polymer which is charred, burned, or otherwise discolored to off-white in said drying zone by intimate and prolonged contact with said heating surfaces to a vibrating screen zone adapted to pass only specification polymer particles therethrough, passing said effluent through said screen zone in a period of time sufficient to allow substantially all of said specification polymer particles to pass therethrough, continuously removing off-specification polymer from said screen zone thereby preventing collection of same on the screen in said zone, collecting said specification polymer particles that pass through said screen zone as the specification polymer product of the method.

2. A method for producing specification polymer comprising forming a mixture of solid, olefin polymer particles and water, separating said particles from said water, drying said particles by passing same through a drying zone in which the polymer is directly exposed to and in part contacted with heating surfaces of said zone and in which the polymer is heated to a temperature in the range of from about 212 to about 300° F., passing the effluent from said drying zone which contains both white specification olefin polymer particles and substantially larger off-specification cake olefin polymer which is charred, burned, or otherwise discolored to off-white in said drying zone by intimate and prolonged contact with said heating surfaces to a vibrating screen zone adapted to pass only the smaller polymer particles therethrough, passing said effluent through said screen zone in a period of time sufficient to allow substantially all of said specification polymer particles to pass therethrough, continuously removing off-specification cake polymer from said screen zone thereby preventing build-up of same on the screen in said zone, collecting said specification polymer particles that pass through said screen zone as the product of the method.

3. A method for producing specification polyethylene comprising forming a mixture of solid polyethylene particles in water, separating said particles from said water, drying said particles by passing same through a drying zone in which the polymer is directly exposed to and in part contacted with heating surfaces of said zone and in which the polymer is heated to a temperature of from about 210 to about 300° F., passing the effluent from said drying zone which contains both white specification polyethylene particles and substantially larger, off-specification cake polymer which is charred, burned, or otherwise discolored to off-white in said drying zone by intimate and prolonged contact with said heating surfaces to a vibrating screen zone adapted to pass only specification polyethylene particles therethrough, passing said effluent through said screen zone in a period of a few minutes, during said period of a few minutes continuously removing off-specification cake polyethylene from said screen zone thereby preventing build-up of same on the screen in said zone, collecting said specification polyethylene particles that pass through said screen zone as the product of the method.

4. The method according to claim 3 wherein the specification polyethylene particles have a maximum, major axis length no more than ⅛ inch, the off-specification cake polymer has a maximum, major axis length no less than ½ inch and the screen zone is adapted to pass particles of no more than 4 mesh size.

References Cited

UNITED STATES PATENTS

| 2,545,144 | 3/1951 | Green et al. | 260—96 |
| 2,970,991 | 2/1961 | Cines | 260—94.9 |

OTHER REFERENCES

J. Perry, Chemical Engineer's Handbook, 3rd edition, 1950, pp. 956–57.

JOSEPH L. SCHOFER, *Primary Examiner.*

L. EDELMAN, *Assistant Examiner.*

U.S. Cl. X.R.

260—93.7, 94.7